United States Patent
Tomita et al.

(10) Patent No.: US 7,913,805 B2
(45) Date of Patent: Mar. 29, 2011

(54) ELECTRIC POWER STEERING APPARATUS

(75) Inventors: Akihiro Tomita, Okazaki (JP); Atsuo Sakai, Okazaki (JP); Satoru Mikamo, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 12/688,250

(22) Filed: Jan. 15, 2010

(65) Prior Publication Data

US 2010/0181140 A1    Jul. 22, 2010

(30) Foreign Application Priority Data

Jan. 21, 2009    (JP) ................. 2009-010916

(51) Int. Cl.
 *B62D 5/04*    (2006.01)
(52) U.S. Cl. ....................... 180/446; 180/443
(58) Field of Classification Search ............... 180/446, 180/443; 701/29, 41
See application file for complete search history.

(56) References Cited

U.S. PATENT DOCUMENTS

| | | | | |
|---|---|---|---|---|
| 7,845,459 B2* | 12/2010 | Kasai | ............... | 180/443 |
| 2003/0106738 A1* | 6/2003 | Yoneda et al. | ............... | 180/446 |
| 2005/0071061 A1* | 3/2005 | Kato et al. | ............... | 701/41 |
| 2006/0086560 A1 | 4/2006 | Furusho et al. | | |
| 2008/0277191 A1* | 11/2008 | Kasai | ............... | 180/444 |
| 2009/0192665 A1* | 7/2009 | Nozawa | ............... | 701/29 |

FOREIGN PATENT DOCUMENTS

| | | |
|---|---|---|
| EP | 2 052 947 A1 | 4/2009 |
| JP | A-2004-336913 | 11/2004 |
| JP | A-2006-151360 | 6/2006 |

OTHER PUBLICATIONS

European Search Report issued May 26, 2010 in European Patent Application No. 10 15 1179.

* cited by examiner

*Primary Examiner* — Paul N Dickson
*Assistant Examiner* — Tashiana Adams
(74) *Attorney, Agent, or Firm* — Oliff & Berridge, PLC

(57) ABSTRACT

A rotational angle sensor used in an electric power steering apparatus detects a rotational angle of a motor shaft at a portion on a steering system side, as a motor rotational angle ($\theta m$). A MPU sets a base correction amount ($\Delta\theta'm$) based on a q-axis actual current value (Iq). The MPU sets a rotational angle correction amount ($\Delta\theta m$) used to correct the motor rotational angle ($\theta m$) by decreasing the base correction amount ($\Delta\theta'm$) as a rotational angular speed ($\omega$) increases and by increasing the base correction amount ($\Delta\theta'm$) as a torque differential value (dT/dt) increases.

4 Claims, 3 Drawing Sheets

ELECTRIC POWER STEERING APPARATUS

INCORPORATION BY REFERENCE

The disclosure of Japanese Patent Application No. 2009-010916 filed on Jan. 21, 2009 including the specification, drawings and abstract is incorporated herein by reference in its entirety.

BACKGROUND OF THE INVENTION

1. Field of the Invention

The invention relates to an electric power steering apparatus including an assist motor that assists a steering operation based on a motor rotational angle.

2. Description of the Related Art

As a technology pertaining to an electric power steering apparatus including an assist motor that assists a steering operation based on a motor rotational angle, for example, Japanese Patent Application Publication No. 2006-151360 (JP-A-2006-151360) describes a vehicle steering apparatus. This vehicle steering apparatus computes a virtual steering model input torque based on a steering torque that is detected by a steering torque sensor and an actual steering angle that is detected by a steering angle sensor. Then, an assist motor command value is computed so that the actual steering angle that is detected by the steering angle sensor coincides with a target steering angle that is set based on the virtual steering model input torque and a rack axial force that is detected by a rack axial force sensor.

In order to set an assist motor command value, a rotational angle of a rotor of an assist motor needs to be accurately detected by a rotational angle sensor. However, for example, when a rotational angle sensor is provided in a control unit that controls an assist motor and this control unit is provided at a position on a load side of a motor shaft, which is distant from a rotor of the assist motor, that is, when the rotational angle sensor is provided at such a position that the rotational angle sensor detects a rotational angle of a portion of the motor shaft, which is distant from the rotor of the assist motor, as the motor rotational angle, if a high load is applied and a torsion amount of the motor shaft increases, a detection error in the motor rotational angle that is detected by the rotational angle sensor also increases. Especially when a motor having a small-diameter motor shaft is used, a torsion amount of the motor shaft increases and the above-mentioned detection error further increases. An increase in the detection error causes a problem that an optimum motor current is not supplied to a motor coil and an ineffective current supply increases.

SUMMARY OF THE INVENTION

It is an object of the invention to provide an electric power steering apparatus with which the above-described problem is solved.

An aspect of the invention relates to an electric power steering apparatus, including: a motor that is operable to transmit an assist force corresponding to a steering torque transmitted to a steering system of a vehicle, to the steering system; a torque detector that detects the steering torque; a rotational angle detector that detects a motor rotational angle of a motor shaft of the motor; a current value detector that detects a motor current value that is a value of a motor current that is supplied to the motor; a correction amount setting unit that sets a rotational angle correction amount that is used to correct the motor rotational angle; and a controller that controls driving of the motor based on the steering torque, the rotational angle correction amount and the motor rotational angle. The rotational angle detector detects a rotational angle of the motor shaft at a portion on a steering system side, as the motor rotational angle. The correction amount setting unit sets a base correction amount based on the motor current value. The correction amount setting unit sets the rotational angle correction amount by decreasing the base correction amount as a value obtained by executing a temporal differentiation on the motor rotational angle increases and by increasing the base correction amount as a value obtained by executing a temporal differentiation on the steering torque increases.

As described above, the base correction amount is set based on the motor current value, that is, the torque output from the assist motor. If the base correction amount is decreased as the value obtained by executing the temporal differentiation on the motor rotational angle increases, it is possible to set the rotational angle correction amount with which oscillation of the motor rotational angle is suppressed. If the base correction amount is increased as the value obtained by executing the temporal differentiation on the steering torque increases, it is possible to set the rotational angle correction amount with which the response to the steering torque is improved. Therefore, even if the rotational angle detector detects the rotational angle of the motor shaft at a portion on the steering system side, as the motor rotational angle, it is possible to decrease a detection error in the motor rotational angle due to torsion of the motor shaft.

BRIEF DESCRIPTION OF THE DRAWINGS

The foregoing and further features and advantages of the invention will become apparent from the following description of an example embodiment with reference to the accompanying drawings, wherein like numerals are used to represent like elements and wherein.

DETAILED DESCRIPTION OF THE EMBODIMENT

Figure 1A:
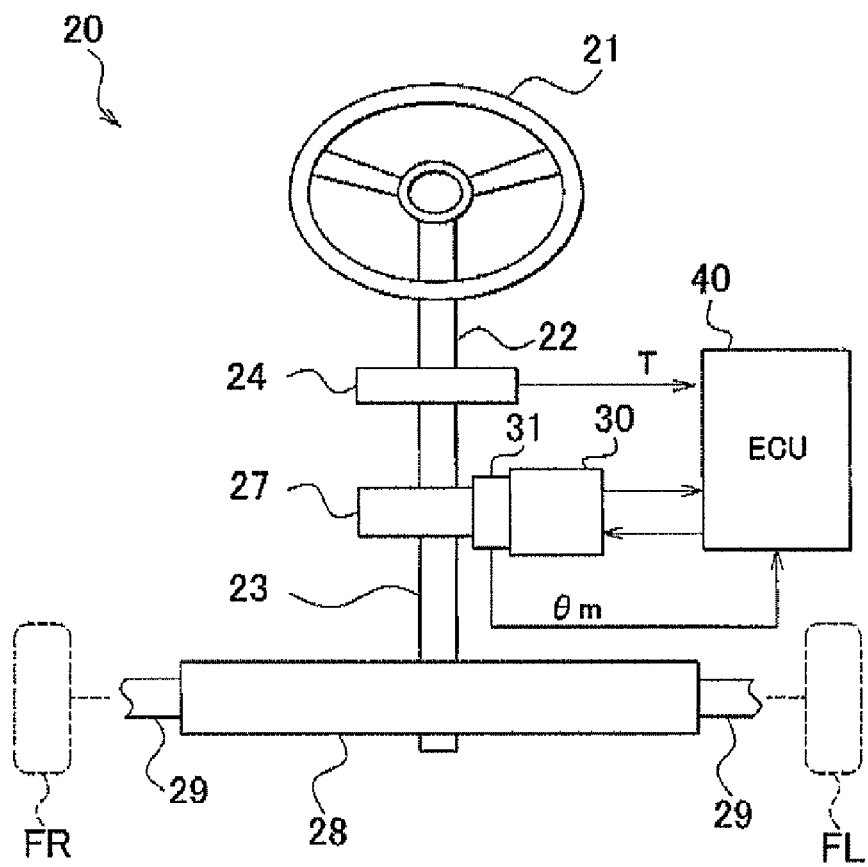
FIG. 1A is a configuration diagram showing an example of an overall configuration of an electric power steering apparatus according to an embodiment of the invention.
Figure 1B:
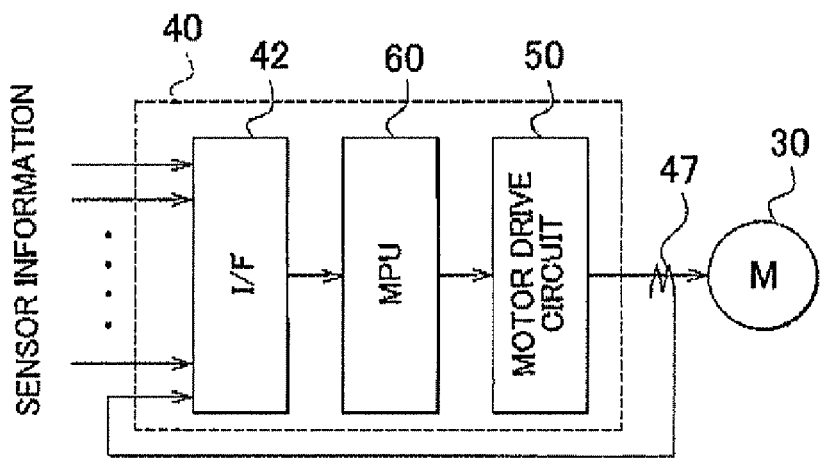
FIG. 1B is a circuit block diagram showing an example of a configuration of an ECU, etc.

Hereafter, an embodiment of the invention will be described with reference to the accompanying drawings. First, a configuration of an electric power steering apparatus according to the embodiment will be described with reference to FIG. 1A and FIG. 1B. FIG. 1A is a configuration diagram showing an example of an overall configuration of an electric power steering apparatus 20 according to the embodiment. FIG. 1B is a circuit block diagram showing an example of a configuration of an ECU 40, etc.

As shown in FIG. 1A, the electric power steering apparatus 20 is formed mainly of a steering wheel 21, a steering shaft 22, a pinion input shaft 23, a torque sensor 24, a speed reducer 27, a rack-and-pinion mechanism 28, rods 29, an assist motor 30, a rotational angle sensor 31, the ECU 40, etc.

A first end of the steering shaft 22 is connected to the steering wheel 21, and an input-side portion of the torque sensor 24 is connected to a second end of the steering shaft 22. A first end of the pinion input shaft 23 of the rack-and-pinion mechanism 28 is connected to an output-side portion of the torque sensor 24. The torque sensor 24 is formed of a torsion bar (not shown) and two resolvers that are fitted to respective ends of the torsion bar in such a manner that the torsion bar is sandwiched between the two resolvers. For example, an amount of torsion of the torsion bar that is caused between a first end of the torsion bar, which is an input-side end, and a second end of the torsion bar, which is an output-side end, is detected with the use of the two resolvers. Thus, a steering torque T generated by the steering wheel 21 is detected.

The speed reducer 27 is connected to an intermediate portion of the pinion input shaft 23 that is connected to the output-side portion of the torque sensor 24. With this configuration, an assist force output from the assist motor 30 is transmitted to the pinion input shaft 23 via the speed reducer 27.

That is, although not shown in the drawings, the speed reducer 27 that serves as a power transmission mechanism is configured in such a manner that a motor gear fitted to a motor shaft of the assist motor 30 may mesh with a speed reduction gear of the speed reducer 27. When the motor shaft of the assist motor 30 rotates, the speed reduction gear of the speed reducer 27 rotates at a speed achieved based on a predetermined speed reduction ratio. Thus, a driving force (assist force) generated by the assist motor 30 is transmitted to the pinion input shaft 23.

The rotational angle sensor 31 that detects a rotational angle θm of the motor shaft is provided on a steering system side of the motor shaft of the assist motor 30 (i.e., provided at a position that is distant from a rotor of the assist motor 30 and that is close to a load). In the embodiment, because the rotational angle sensor 31 is provided in the ECU 40 that is provided on the steering system side of the motor shaft, the rotational angle sensor 31 is distant from the rotor of the assist motor 30. Note that, for ease of explanation, the rotational angle sensor 31 and the ECU 40 are shown at different positions in FIG. 1A.

If the rotational angle sensor 31 is distant from the rotor of the assist motor 30, a detection error in the rotational angle θm that is detected by the rotational angle sensor 31 increases due to torsion of the motor shaft. Especially when a motor having a small-diameter motor shaft is used, torsion of the motor shaft increases and the above-mentioned detection error further increases.

Therefore, according to the embodiment, a rotational angle correction amount Δθm that is used to correct the motor rotational angle θm is set so that the above-mentioned detection error is decreased.

A pinion gear that may mesh with a rack groove of a rack shaft (not shown) that forms the rack-and-pinion mechanism 28 is formed in a second end portion of the pinion input shaft 23. The rack-and-pinion mechanism 28 converts a rotational movement of the pinion input shaft 23 into a linear movement of the rack shaft. The rods 29 are connected to the respective ends of the rack shaft, and a steered wheel FR and a steered wheel FL are connected to the ends of the respective rods 29 via knuckles (not shown). When the pinion input shaft 23 rotates, the actual steering angle of the steered wheel FR and the steered wheel FL is changed via the rack-and-pinion mechanism 28, the rods 29, etc.

Next, an electrical configuration of the ECU 40 will be described with reference to FIG. 1B.

As shown in FIG. 1B, the ECU 40 is mainly formed of a MPU (Micro Processor Unit) 60 that includes peripheral LSI such as an A/D converter, a memory, etc., an interface 42, a motor drive circuit 50 that may supply a motor current to the assist motor 30 under a PWM control based on a PWM signal output from the MPU 60, etc.

FIG. 1B also shows a current sensor 47 that detects values of motor currents that actually flow to the assist motor 30 (three phase current values Iu, Iv, and Iw). The information concerning the motor current values detected by the current sensor 47 may be input in the MPU 60 via the interface 42 as a motor current signal.

The MPU 60 is formed of, for example, a microcomputer, and semiconductor memory units (ROM, RAM, EEPROM, etc.). The MPU 60 has a function of executing a basic assist motor control for the electric power steering apparatus 20 based on a predetermined computer program. That is, the MPU 60 executes a vector control over the assist motor 30 based on the steering torque T detected by the torque sensor 24, the motor rotational angle θm detected by the rotational angle sensor 31, the motor current values detected by the current sensor 47, etc.

The interface 42 has a function of inputting various sensor signals received from the above-described torque sensor 24, rotational angle sensor 31, current sensor 47, or the like to a predetermined port of the MPU 60 via, for example, the A/D converter.

Figure 2:
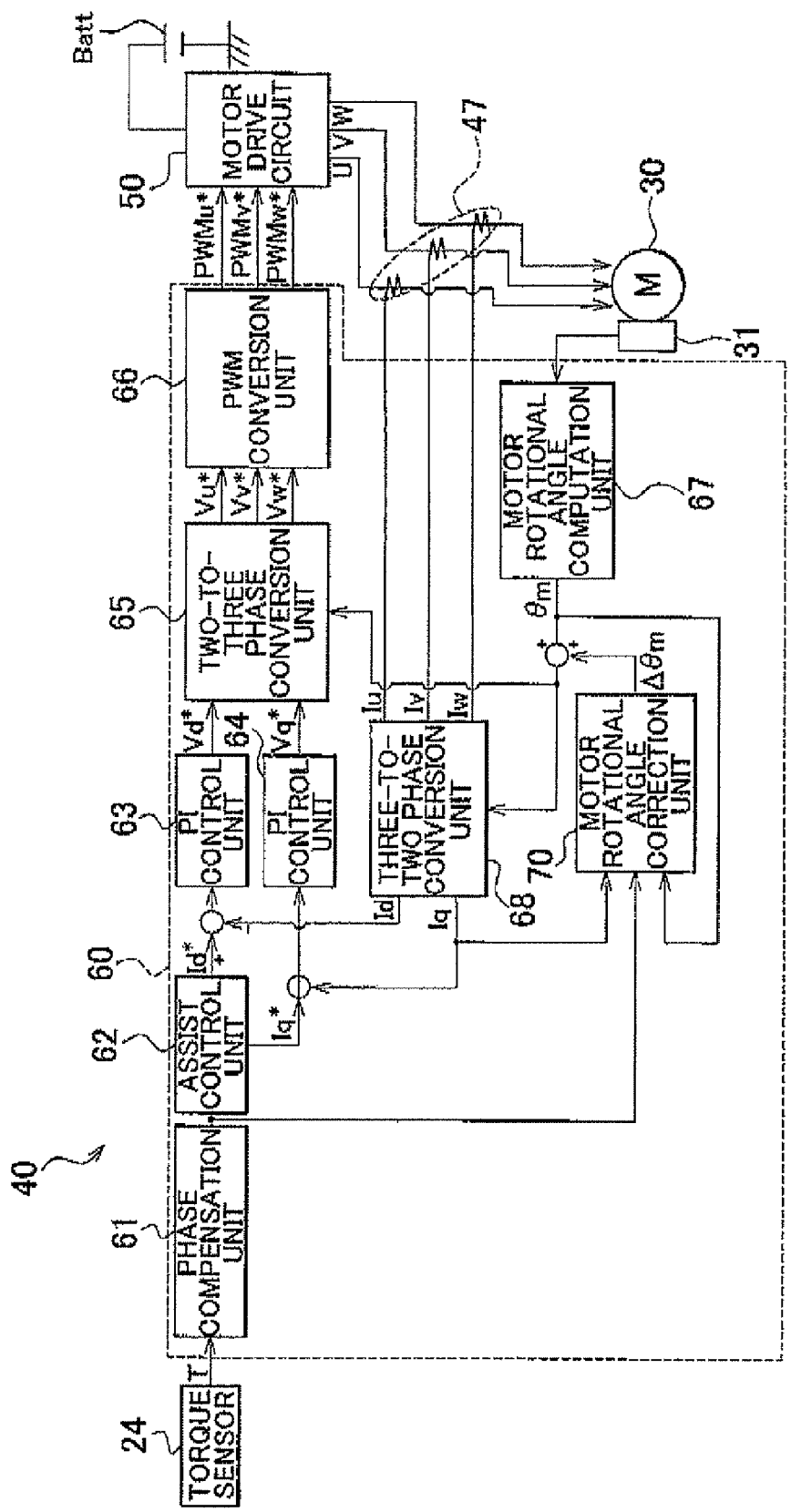
FIG. 2 is a block diagram showing a control for an assist motor executed by the ECU.

The motor drive circuit 50 has a function of converting an electric current supplied from a direct-current power source into a controllable three-phase alternating current (see FIG. 2). The motor drive circuit 50 is formed of a PWM circuit, a switching circuit, etc.

The ECU 40 executes a PI control (proportional-integral control) (described later in detail) so as to cause the assist motor 30 to generate an assist torque suitable for a steering state based on a signal corresponding to the steering torque T detected by the torque sensor 24, a signal corresponding to the motor rotational angle θm detected by the rotational angle sensor 31, or the three-phase current values Iu, Iv and Iw detected by the current sensor 47. Therefore, the electric power steering apparatus 20 is able to assist a driver in operating the steering wheel 21.

Figure 3:
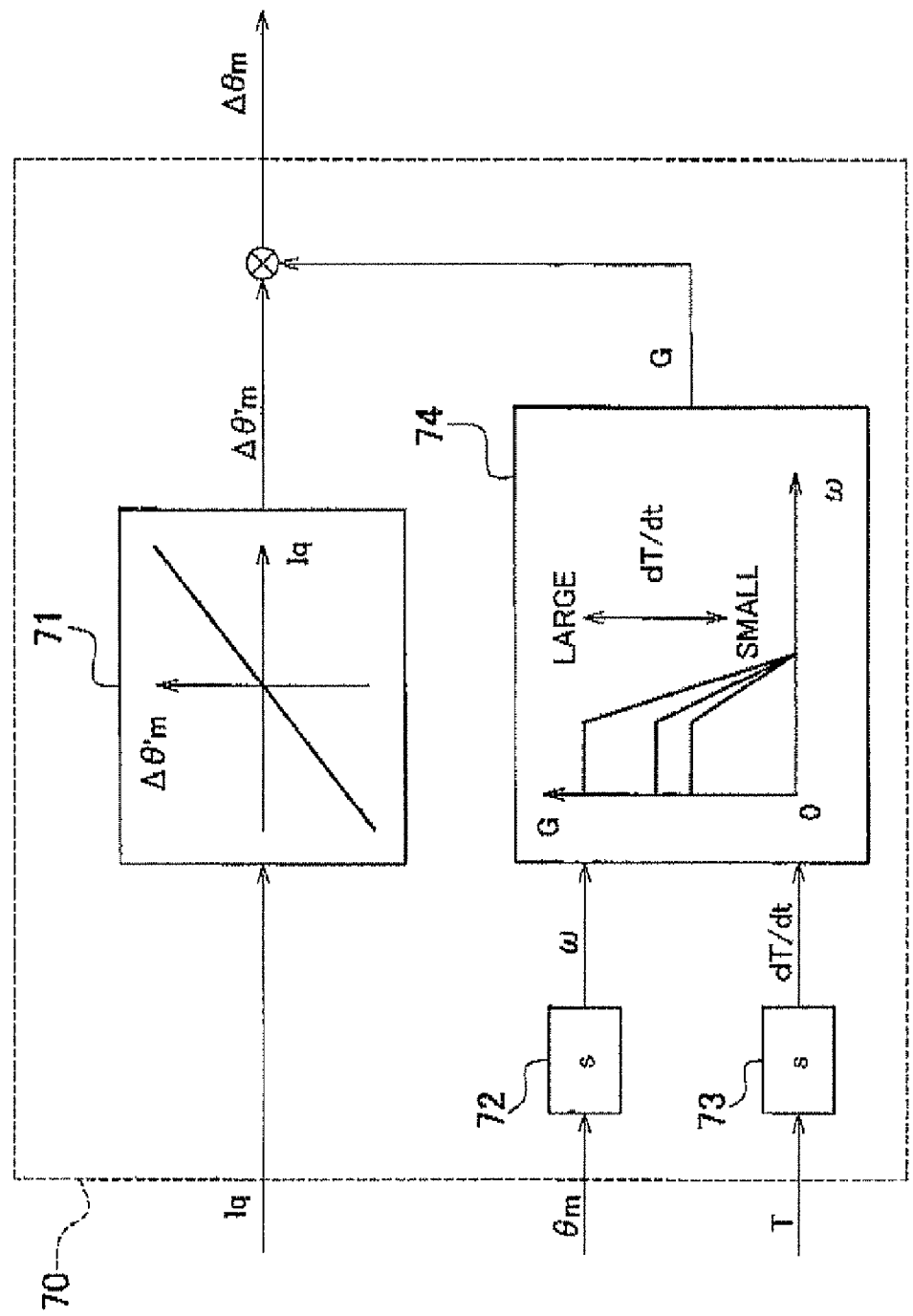
FIG. 3 is a control block diagram showing a functional configuration of a motor rotational angle correction unit in FIG. 2.

Next, a computation process for the assist motor 30 executed by a PI control system of the ECU 40 will be described with reference to FIGS. 2 and 3. FIG. 2 is a block diagram showing a control for the assist motor 30 executed by the ECU 40. FIG. 3 is a control block diagram showing a functional configuration of a motor rotational angle correction unit 70 in FIG. 2. The computation process is executed as, for example, a timer interrupt process that is executed by the MPU 60 of the ECU 40 at predetermined time intervals (e.g. time intervals of 0.2 milliseconds).

As shown in FIG. 2, a signal corresponding to the steering torque T that is input in the MPU 60 from the torque sensor 24 is input in a phase compensation unit 61 after a noise content is removed from the signal by a filter circuit (not shown). The phase compensation unit 61 executes a phase compensation process for advancing a phase to improve a response to the output from the torque sensor 24. Then, the phase compensation unit 61 outputs a phase-compensated torque signal to an assist control unit 62 and the motor rotational angle correction unit 70.

In order to assist a steering operation based on the steering torque T that is received from the phase compensation unit 61, the assist control unit 62 sets a field current value (d-axis current command value Id*), which is a current value for a secondary magnetic flux that is generated by the assist motor 30, and a torque command current value (q-axis current command value Iq*), which is a current value corresponding to the assist torque. For example, the d-axis current command value Id* is set by a field weakening control, and the q-axis current command value Iq* is set based on the detected torque according to a predetermined map or computing equation. The set d-axis current command value Id* and q-axis current command value Iq* are output to an addition units that are positioned upstream of PI control units 63 and 64, respectively.

The addition unit positioned upstream of the PI control unit 63 executes an addition process for obtaining a deviation of a d-axis actual current value Id in the motor drive circuit 50 that is fed back from a three-to-two phase conversion unit 68 from the d-axis current command value Id* output from the assist control unit 62. The addition unit positioned upstream of the PI control unit 64 executes an addition process for obtaining a deviation of a q-axis actual current value Iq in the motor drive circuit 50 that is fed back from the three-to-two phase conversion unit 68 from the q-axis current command value Iq* that is output from the assist control unit 62. Thus, the deviation of the d-axis actual current value Id from the d-axis current command value Id* and the deviation of the q-axis actual current value Iq from the q-axis current command value Iq* are computed and output to the PI control unit 63 and the PI control unit 64, respectively.

The PI control units 63 and 64 each execute a proportional-integral control. That is, the PI control unit 63 executes a proportional-integral computation based on the deviation of the d-axis actual current value Id from the d-axis current command value Id* that is output from the addition unit positioned upstream of the PI control unit 63 and predetermined proportional sensitivity and integral gain, and executes a process of outputting a d-axis voltage command value Vd* to a two-to-three phase conversion unit 65 as an operation of correcting an integration value until a target value is achieved. That is, the PI control unit 63 executes a feedback computation process together with the addition unit.

Similarly, the PI control unit 64 executes a proportional-integral computation based on the deviation of the q-axis actual current value Iq from the q-axis current command value Iq* and predetermined proportional sensitivity and integral gain, and executes a process of outputting a q-axis voltage command value Vq* to the two-to-three phase conversion unit 65 as an operation of correcting an integration value until a target value is achieved.

The two-to-three phase conversion unit 65 executes a dq reverse conversion (three-phase conversion) over the d-axis voltage command value Vd* received from the PI control unit 63 and the q-axis voltage command value Vq* received from the PI control unit 64 based on the motor rotational angle $\theta m$ to which the rotational angle correction amount $\Delta\theta m$ (described later in detail) has been added. Thus, a U-phase voltage command value Vu*, a V-phase voltage command value Vv*, and W-phase voltage command value Vw* are computed. The voltage command values that have undergone the reverse conversion executed by the two-to-three phase conversion unit 65 are output to a PWM conversion unit 66 as the U-phase voltage command value Vu*, the V-phase voltage command value Vv* and the W-phase voltage command value Vw*.

The PWM conversion unit 66 converts the U-phase voltage command value Vu*, the V-phase voltage command value Vv* and the W-phase voltage command value Vw* into a U-phase PWM command value PWMu*, a V-phase PWM command value PWMv*, and a W-phase PWM command value PWMw*, respectively.

The motor drive circuit 50 turns on or off a U-phase switching circuit, a V-phase switching circuit, and a W-phase switching circuit (all of which are not shown) based on signals indicating the U-phase PWM command value PWMu*, the V-phase PWM command value PWMv*, and the W-phase PWM command value PWMw* that are output from the PWM conversion unit 66, respectively. Thus, the motor drive circuit 50 converts the direct-current supplied from the direct-current power source into the three-phase alternating current and supplies the three-phase alternating current to the assist motor 30 as a drive current. Therefore, an assist torque suitable for the steering state detected by the torque sensor 24, the rotational angle sensor 31, etc. is generated by the assist motor 30.

A U-phase current, a V-phase current and a W-phase current output from the motor drive circuit 50 are individually detected by the current sensor 47, and output to the three-to-two phase conversion unit 68 as a U-phase actual current value Iu, a V-phase actual current value Iv and a W-phase actual current value Iw, respectively.

A motor rotational angle computation unit 67 computes the motor rotational angle $\theta m$ based on a signal corresponding to the motor rotational angle that is received from the rotational angle sensor 31. The computed motor rotational angle $\theta m$ is output to the motor rotational angle correction unit 70 and the rotational angle correction amount $\Delta\theta m$ is set, and the motor rotational angle $\theta m$ to which the rotational angle correction amount $\Delta\theta m$ has been added is output to the three-to-two phase conversion unit 68.

The three-to-two phase conversion unit 68 executes a dq conversion (two-phase conversion) over the U-phase actual current value Iu, the V-phase actual current value Iv and the W-phase actual current value Iw that are received from the current sensor 47 based on the motor rotational angle $\theta m$ to which the rotational angle correction amount $\Delta\theta m$ has been added to compute the d-axis actual current value Id and the q-axis actual current value Iq. The current values output from the motor drive circuit 50 that have undergone the dq conversion executed by the three-to-two phase conversion unit 68 are fed back to the addition units positioned upstream of the above-described PI control units 63 and 64 as the d-axis actual current value Id and the q-axis actual current value Iq, respectively. Thus, the feedback computation process is executed by the PI control units 63 and 64 as described above. The q-axis actual current value Iq is output also to the motor rotational angle correction unit 70.

Next, a process of setting the rotational angle correction amount $\Delta\theta m$ executed by the motor rotational angle correction unit 70 will be described with reference to FIG. 3.

As shown in FIG. 3, the motor rotational angle correction unit 70 sets the rotational angle correction amount $\Delta\theta m$ used to decrease a detection error in the motor rotational angle $\theta m$ that is caused by torsion of the motor shaft based on the q-axis actual current value Iq, the motor rotational angle $\theta m$, and the steering torque T. The motor rotational angle correction unit 70 is formed of a base correction amount setting unit 71, differentiators 72 and 73, and a gain setting unit 74.

The base correction amount setting unit 71 sets a base correction amount $\Delta\theta' m$ based on the q-axis actual current value Iq. The base correction amount $\Delta\theta' m$ is set with, for example, a spring constant of the motor shaft taken into account in such a manner that the base correction amount $\Delta\theta' m$ increases as the q-axis actual current value Iq increases.

The differentiator 72 executes a temporal differentiation on the motor rotational angle $\theta m$ that is received from the motor rotational angle computation unit 67 to compute a rotational angular speed $\omega$, and outputs the rotational angular speed $\omega$ to the gain setting unit 74. The differentiator 73 executes a temporal differentiation on the steering torque T that is received from the phase compensation unit 61 to compute a torque differential value dT/dt, and outputs the torque differential value dT/dt to the gain setting unit 74.

The gain setting unit 74 sets a gain G by which the base correction amount Δθ'm is multiplied based on the rotational angular speed ω and the torque differential value dT/dt. More specifically, the gain G is set in such a manner that the gain G decreases as the rotational angular speed ω increases so that oscillation of the motor rotational angle is suppressed, as shown in FIG. 3. Also, the gain G is set in such a manner that the gain G increases as the torque differential value dT/dt increases so that a response to the steering torque improves.

Then, the rotational angle correction amount Δθm is set by multiplying the base correction amount Δθ'm set by the base correction amount setting unit 71 by the gain G set by the gain setting unit 74.

As described above, in the electric power steering apparatus 20 according to the embodiment, the rotational angle sensor 31 detects the rotational angle of the motor shaft at a portion on the steering system side, as the motor rotational angle θm. The MPU 60 sets the base correction amount Δθ'm based on the q-axis actual current value Iq. The MPU 60 decreases the base correction amount Δθ'm as the rotational angular speed ω increases, and increases the base correction amount Δθ'm as the torque differential value dT/dt increases. Thus, the MPU 60 sets the rotational angle correction amount Δθm that is used to correct the motor rotational angle Δθm.

The base correction amount Δθ'm is set based on the q-axis actual current value Iq, that is, the torque output from the assist motor 30. If the base correction amount Δθ'm is decreased as the rotational angular speed ω increases, it is possible to set the rotational angle correction amount Δθm with which oscillation of the motor rotational angle θm is suppressed. If the base correction amount Δθ'm is increased as the torque differential value dT/dt increases, it is possible to set the rotational angle correction amount Δθm with which the response to the steering torque T is improved.

Therefore, even if the rotational angle sensor 31 detects the rotational angle of the motor shaft at a portion on the steering system side, as the motor rotational angle θm, it is possible to decrease a detection error in the motor rotational angle θm due to torsion of the motor shaft.

What is claimed is:

1. An electric power steering apparatus, comprising:
   a motor that is operable to transmit an assist force corresponding to a steering torque transmitted to a steering system of a vehicle, to the steering system;
   a torque detector that detects the steering torque;
   a rotational angle detector that detects a motor rotational angle of a motor shaft of the motor;
   a current value detector that detects a motor current value that is a value of a motor current that is supplied to the motor;
   a correction amount setting unit that sets a rotational angle correction amount that is used to correct the motor rotational angle; and
   a controller that controls driving of the motor based on the steering torque, the rotational angle correction amount and the motor rotational angle, wherein
   the rotational angle detector detects a rotational angle of the motor shaft at a portion on a steering system side, as the motor rotational angle, and
   the correction amount setting unit sets a base correction amount based on the motor current value.

2. The electric power steering apparatus according to claim 1, wherein the correction amount setting unit sets the rotational angle correction amount by decreasing the base correction amount as a value obtained by executing a temporal differentiation on the motor rotational angle increases.

3. The electric power steering apparatus according to claim 1, wherein the correction amount setting unit sets the rotational angle correction amount by increasing the base correction amount as a value obtained by executing a temporal differentiation on the steering torque increases.

4. The electric power steering apparatus according to claim 2, wherein the correction amount setting unit sets the rotational angle correction amount by increasing the base correction amount as a value obtained by executing a temporal differentiation on the steering torque increases.

* * * * *